LOUIS EATON SHAW
INVENTOR.

March 20, 1956 L. E. SHAW 2,738,688
DIFFERENTIAL TYPE VARIABLE SPEED DEVICE
Filed Aug. 20, 1952 2 Sheets-Sheet 2

LOUIS EATON SHAW
INVENTOR.

BY [signature]
attorney

United States Patent Office 2,738,688
Patented Mar. 20, 1956

2,738,688

DIFFERENTIAL TYPE VARIABLE SPEED DEVICE

Louis Eaton Shaw, Newark, N. J.

Application August 20, 1952, Serial No. 305,433

7 Claims. (Cl. 74—689)

This invention relates to differential type variable speed devices or power transmissions embodying two sun gears driven in opposite directions and one or more pairs of intermeshing planet gears journalled in a housing wherein when the sun gears are revolving in opposite directions at the same speed the housing will be stationary, but when the speed of the sun gears differs the housing will revolve in the direction of the fastest moving gear, though at a reduced speed. Thus, the speed and direction of rotation of the housing may be controlled by varying the speed of rotation of one or both of the sun gears. This is accomplished by means of variable pitch sheaves, of shiftable flange construction, connected to the sun gears, and operable in unison to increase the rotational speed of one sun gear and decrease the rotational speed of the other.

One of the problems connected with a drive of this type is that of adjusting the effective pitch diameters of the two sheaves to a point where they will both revolve at exactly the same speed whenever it is desired to hold the housing against rotation, and an object of the present invention is to provide automatic means which will as soon as the rotative speeds of the sheaves approaches what might be termed the zero point, that is, the exact same rotational speed, take over control of their speeds and provide proper adjustment until the same speed of rotation of the two sun gears is provided. The automatic take-over mechanism then holds the rotational speed at this degree until the change is desired and provided by manually operated means. Also, the automatic means will, in the event conditions arise due to change in temperature of operating parts, belt tension, etc., whereby the housing starts to revolve, be set into action by such revolving of the housing and will arrest it.

With these and other objects in view, as may appear from the accompanying specification, the invention consists of various features of construction and combination of parts, which will be first described in connection with the accompanying drawings, showing a differential type variable speed device of a preferred form embodying the invention, and the features forming the invetnion will be specifically pointed out in the claims.

Figure 1:
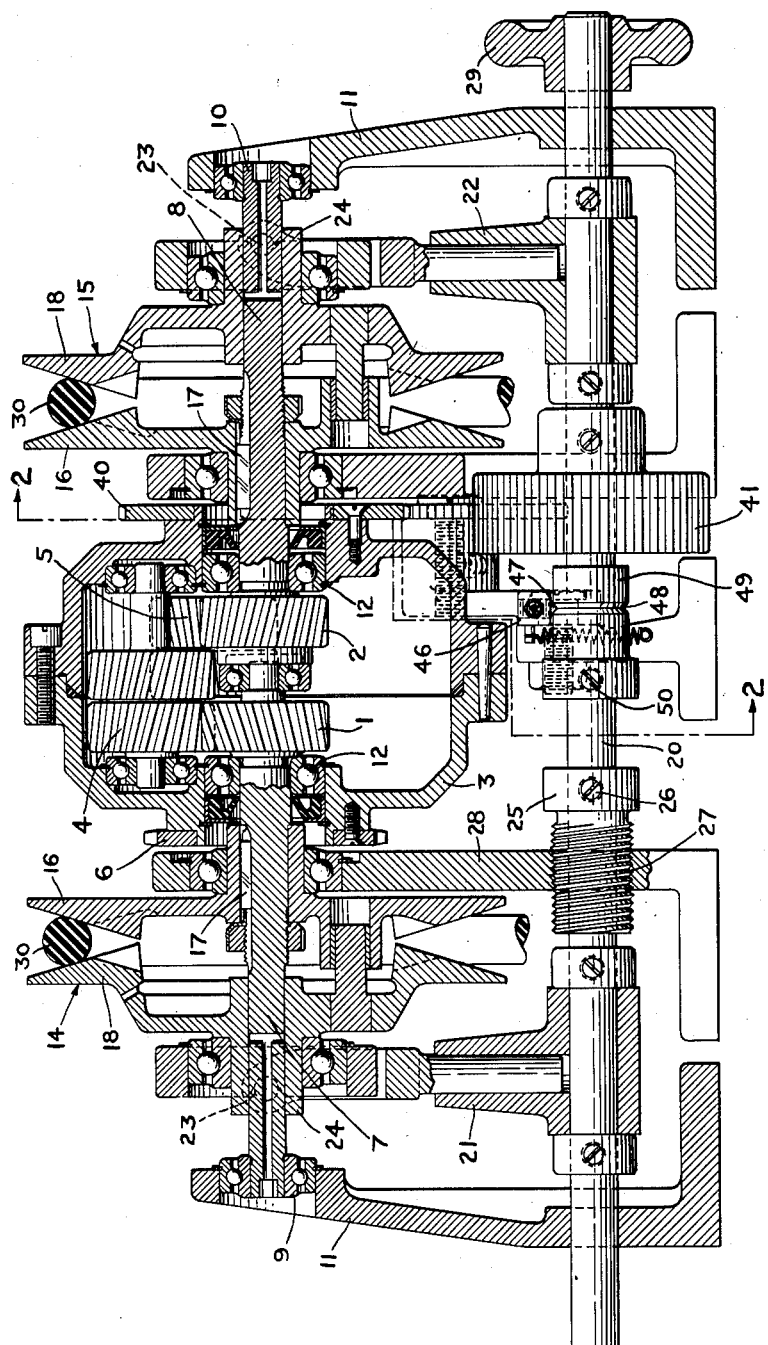
Figure 1 is a longitudinal section through the differential type variable speed device.
Figure 2:
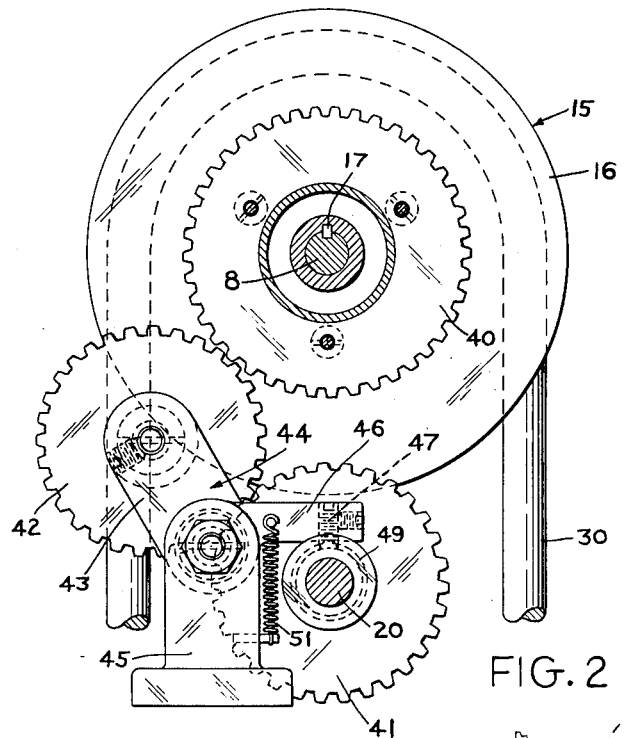
Figure 2 is a cross section taken on the line 2—2 of Figure 1.

Referring more particularly to the drawings, the differential type variable speed device consists of a conventional spur gear type of differential having two sun gears 1 and 2 driven in opposite directions and enclosed within a housing 3 and intermeshing planet gears 4 and 5 journalled in the housing 3. The housing 3 has a power take-off sprocket or pulley 6 attached thereto. The sun gears 1 and 2 are mounted on the ends of shafts 7 and 8 respectively. The shafts 7 and 8 are supported by suitable bearings 9 and 10 of a supporting frame structure 11 and the bearings 12 carried by the housing 3. When the sun gears 1 and 2 are revolving in opposite directions and at the same speed the housing 3 will be stationary, but when the speed of rotation of one of the sun gears differs from the speed of rotation of the other the housing 3 will revolve in the direction of the fastest moving sun gear, though at a reduced speed. Thus, the speed of rotation of the housing 3 as well as its direction of rotation may be controlled by varying the speed of one or both of the sun gears 1 and 2. In the structure shown in Figure 1 of the drawings, the speed of both of the sun gears are varied. The change in the speed of the sun gears is accomplished by means of variable pitch sheaves 14 and 15 mounted on the shafts 7 and 8 respectively. Each of the variable pitch sheaves 14 and 15 includes a tapered or conical-faced flange 16 which is mounted upon the shaft 7 or 8 and keyed thereto as shown at 17 for rotation with the respective shaft. A mating flange 18 is feathered to each of the shafts 7 and 8 and is thus free to move axially of the shaft but to rotate with the shaft. The combination of the fixed flanges 16 and the feathered shiftable flanges 18 provides means whereby the effective pitch diameters of the sheaves 14 and 15 may be varied.

A shaft 20 is provided which is parallel to the sun gear shafts 7 and 8 and is offset therefrom. A pair of swivelled members 21 and 22 are mounted on the shaft 20 for movement with the shaft when it is moved axially or longitudinally and are permitted limited swinging or swivelled movement relative to the shaft 20. The swivelled members 21 and 22 are pivotally connected as indicated by dotted lines at 23 in Figure 1 of the drawings to the gimbal rings surrounding the ball bearings mounted on the elongated bearings 24 of the feathered flanges 18. The flanges 18 and the connection between the flanges and the swivelled members 21 and 22 being disposed in opposed relationship or directions one to the other will result in the movement of the flanges 18 axially of their shafts in the same direction upon axial movement of the shaft 20. Thus when the shaft 20 is moved axially the effective pitch diameter of one of the sheaves 14 and 15 will be increased while the effective diameter of the other of these sheaves will be reduced for the purpose of changing the rotational speed relationship between the sun gears 1 and 2. A threaded collar 25 is mounted on the shaft 20 and fixed thereto by means of a set screw 26. The threaded collar 25 threadably engages in a threaded bore 27 formed in the stationary supporting standard 28 and thus when the shaft 20 is rotated it will also be moved axially. A hand wheel 29 is attached to the shaft 20 to provide manual rotation thereof.

Figures 3, 4:
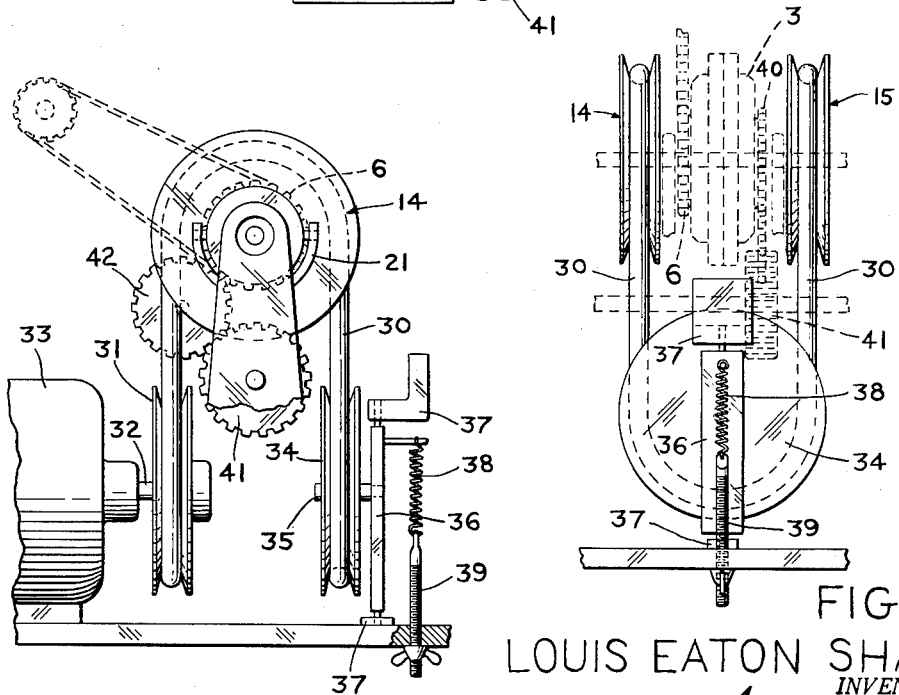
Figure 3 is a fragmentary end view of the differential type variable speed device.
Figure 4 is a fragmentary view taken at right angles to Figure 3.

In driving engagement with the variable pitch sheaves 14 and 15 is a belt 30 of suitable cross-section, although in the drawings it is shown as a round belt. Preferably, a single belt is employed, passing around and driven by a V-groove pulley 31 mounted on the shaft 32 of an electronic motor 33. The axis of the shaft 32 is at right angles to the center line of the shafts 7 and 8. The two reaches of the belt 30 pass around the variable pitch sheaves 14 and 15 and lastly over an idler pulley 34 moutned with its axis as at right angles to the axis of the sun gear shafts 7 and 8. In Figures 3 and 4 of the drawings the shaft 35 of the idler pulley 34 is carried by a supporting element 36 the ends of which are pivotally mounted in suitable stationary brackets 37. Thus, the idler pulley is permitted limited swinging movement perpendicularly to its axis of rotation and such swinging movement is restricted or restrained by means of a spring 38 the position of which may be regulated as desired by means of an adjustable tensioning screw 39.

For the sake of compactness the motor 33 and the pulleys or sheaves 31 and 34 may be placed close to the variable pitch sheaves 14 and 15 in which case a belt of circular cross-section as shown at 30 in the drawings would be employed since such a belt possesses the ability to flex in any direction. It is to be understood, of course, that the pitch diameter of the pulley 31 should closely approximate the center distance between the grooves of the variable pitch sheaves 14 and 15.

If it is desired, a conventional V-belt may be employed, as for example, when the same belt is to be used for driving other elements of a machine and it is important to have all elements start and stop at the same instant. When a conventional V-belt is employed, however, the distance from the point where the belt enters or leaves the variable pitch sheaves 14 and 15 to the point where it enters or leaves another sheave must be great enough to permit the belt to twist easily through 90 degrees, the usual rule being that the center distances of the driving and driven sheaves shall not be less than six times the pitch diameter of the largest sheave.

One of the problems connected with a drive of this type is that of adjusting the effective pitch diameters of the sheaves 14 and 15 to a point where both sheaves will revolve at exactly the same speed whenever it is desired to hold the housing against rotation. If there is the slightest error the drive will "creep" which, in many applications will be serious. The present invention embodies automatic means which as the adjustment of the movable flanges 18 of the variable pitch sheaves 14 approach the position at which the two sheaves would rotate at exactly the same speed, takes over and moves the shaft 20 until the housing 3 comes to rest, and then holds it there.

This mechanism includes a gear 40 attached to the housing 3, a wide faced gear 41 fixed on the shaft 20 and an idler gear 42 located to mesh with both the gears 40 and 41. The idler gear 42 is carried by the arm 43 of a bell crank 44 which is pivotally supported by a suitable supporting bracket 45. The arm 46 of the bell crank 44 has a chisel-pointed screw 47 adjustably carried by its end which is adapted to set in the V-shaped groove 48 formed in the collar 49. The collar 49 is mounted upon the shaft 20 and attached thereto by means of a set screw 50 so that it will both rotate and move axially with the shaft 20. A spring 51 is connected to the bell crank arm 46 and urges it inwardly or towards the axis of the shaft 20 so as to urge the chisel-point of the screw 47 into the V-shaped groove 48.

The teeth of the gears 40 and 42 are cut down nearly to their pitch lines and as a result very little motion is required to move them into or out of engagement.

As the shaft 20 is moved axially by its manual rotation through the medium of the hand wheel 29 and the feathered flanges 18 of the variable pitch sheaves 14 and 15 move towards the point where the effective pitch diameter of the two sheaves 14 and 15 will be equal and consequently at which time both sheaves will be rotating at exactly the same speed, such movement of the shaft 20 will move the V-shaped groove 48 into line with the chisel pointed screw 47 and the spring 51 acting upon the pivoted bell crank 44 will urge the idler gear 42 into mesh with the gear 40 thus causing rotation of the shaft 20 by rotation of the housing 3. Thus, in effect, the adjustment of the flanges 18 of the variable pitch sheaves 14 and 15 will be automatically taken over by the rotation of the housing 3.

When it is desired to again provide rotation of the housing 3 the shaft 20 is manually rotated in a direction depending upon the desired direction of rotation of the housing 3. Such manual rotation of the shaft 20 will move the chisel point of the screw 47 out of the groove 48, move the idler gear 42 out of mesh with the gear 40 and at the same time move the feathered flanges 18 of the sheaves 14 and 15 in opposite directions so that the housing 3 will rotate at the speed and in the direction regulated by the sun gear 1 or 2 which is rotating at the fastest speed.

The gear 41 is a wide faced gear, as clearly shown in Figure 1 of the drawings, so that it may remain constantly meshed with the idler gear 42 as the shaft 20 is moved axially to the right or left.

It will be understood that the invention is not to be limited to the specific construction or arrangement of parts shown, but that they may be widely modified within the invention defined by the claims.

What is claimed is:

1. In a differential type variable speed device, sun gears disposed to face each other and rotatable in opposite directions, a housing rotatably mounted about said sun gears, power take-off means connected to and rotatable with said housing, planetary gears connected in said housing and meshing with said sun gears to be rotated by said sun gears and to rotate said housing depending on the relative speed of rotation of said sun gears, a variable pitch diameter sheave disposed on each side of said housing and connected to and rotatable with the sun gear disposed on the same side of said housing, means for rotating said sheaves in opposite directions, means for adjusting the effective pitch diameters of said sheaves, and means operated by rotation of said housing for taking over adjustment of said sheaves as they approach the same effective pitch diameter adjustment and adjusting them to the same effective pitch diameter for arresting rotation of said housing, and manually operated means for operating said sheave adjusting means and to release said adjustment take over means.

2. In a differential type variable speed device, sun gears disposed to face each other and rotatable in opposite directions, a housing rotatably mounted about said sun gears, power take-off means connected to and rotatable with said housing, planetary gears connected in said housing and meshing with said sun gears to be rotated by said sun gears and to rotate said housing depending on the relative speed of rotation of said sun gears, a variable pitch diameter sheave disposed on each side of said housing and connected to and rotatable with the sun gear disposed on the same side of said housing, means for adjusting the effective pitch diameters of said sheaves, including a shaft, manually rotated means for moving said shaft axially, means connecting said shaft to said sheaves whereby when said shaft is moved axially said sheaves will be adjusted to increase the effective pitch diameter of one sheave and decreasing the effective pitch diameter of the other sheave, means operated by rotation of said housing to move said shaft and adjust said sheaves to the same effective pitch diameter to arrest rotation of said housing, said last-named means being constructed and arranged so that it will take over adjustment of the sheaves as their adjusting movement approaches the position where the effective pitch diameters of the sheaves are equal.

3. In a differential type variable speed device, sun gears disposed to face each other and rotatable in opposite directions, a housing rotatably mounted about said sun gears, power take-off means connected to and rotatable with said housing, planetary gears connected in said housing and meshing with said sun gears to be rotated by said sun gears and to rotate said housing depending on the relative speed of rotation of said sun gears, a variable pitch diameter sheave disposed on each side of said housing and connected to and rotatable with the sun gear disposed on the same side of said housing, means for adjusting the effective pitch diameters of said sheaves, including a shaft, manually rotated means for moving said shaft axially, means connecting said shaft to said sheaves whereby when said shaft is moved axially said sheaves will be adjusted to increase the effective pitch diameter of one sheave and decrease the effective pitch diameter of the other sheave, means operated by rotation of said housing to move said shaft and adjust said sheaves to the same effective pitch diameter to arrest rotation of said housing, said last-named means being constructed and arranged so that it will take over adjustment of the sheaves as their adjusting movement approaches the position where the effective pitch diameters of the sheaves are equal, said last-named means including a collar on said shaft and having a groove therein, and a holding gear for engagement in said groove when the effective pitch diameter of said sheaves are equal.

4. In a differential type variable speed device, sun gears disposed to face each other and rotatable in opposite directions, a housing rotatably mounted about said sun gears, power take-off means connected to and rotatable with said housing, planetary gears connected in said housing and meshing with said sun gears to be rotated by said sun gears and to rotate said housing depending on the relative speed of rotation of said sun gears, a variable pitch diameter sheave disposed on each side of said housing and connected to and rotatable with the sun gear disposed on the same side of said housing, means for adjusting the effective pitch diameters of said sheaves, including a shaft, manually rotated means for moving said shaft axially, means connecting said shaft to said sheaves whereby when said shaft is moved axially said sheaves will be adjusted to increase the effective pitch diameter of the other sheave, a gear on said housing, a wide faced gear on said shaft, an idler gear movable upon axial movement of said shaft into and out of meshing operative engagement with said housing carried gear, said idler gear meshing with said wide-faced gear whereby when said idler gear is in mesh with said housing carried gear said shaft will be rotated and moved axially to adjust said sheaves to the positions where their effective pitch diameters are equal.

5. In a differential type variable speed device, sun gears disposed to face each other and rotatable in opposite directions, a housing rotatably mounted about said sun gears, power take-off means connected to and rotatable with said housing, planetary gears connected in said housing and meshing with said sun gears to be rotated by said sun gears and to rotate said housing depending on the relative speed of rotation of said sun gears, a variable pitch diameter sheave disposed on each side of said housing and connected to and rotatable with the sun gear disposed on the same side of said housing, means for adjusting the effective pitch diameters of said sheaves, including a shaft, manually rotated means for moving said shaft axially, means connecting said shaft to said sheaves whereby when said shaft is moved axially said sheaves will be adjusted to increase the effective pitch diameter of one sheave and decrease the effective pitch diameter of the other sheave, a gear on said housing, a wide-faced gear on said shaft, an idler gear movable upon axial movement of said shaft into and out of meshing operative engagement with said housing carried gear, said idler gear meshing with said wide-faced gear whereby when said idler gear is in mesh with said housing carried gear said shaft will be rotated and moved axially to adjust said sheaves to the position where their effective pitch diameters are equal, a collar on said shaft having a groove therein, a pivotally mounted bell crank, said idler gear carried by said bell crank, a holding wedge carried by said bell crank and movable into said groove when the adjustment of said sheaves reaches the position where their effective pitch diameters are equal, and a spring connected to said bell crank to urge said gear into said groove and to move said idler gear out of meshing engagement with said housing carried gear when said gear moves into said groove.

6. In a differential type variable speed device, a housing, planetary gears carried by said housing, sun gears meshing with said planetary gears and rotatable in opposite directions, variable pitch diameter sheaves connected to said sun planetary gears for rotating them and rotating said housing, power take-off means carried by and rotated with said housing, a driving sheave having its axis of rotation at approximately right angles to the axis of rotation of said variable pitch sheaves, an idler sheave having its axis approximately parallel with the axis of said driving sheave, a single power transmitting belt over said driving sheave, variable pitch sheaves, and said idler sheave, means for adjusting the effective pitch diameters of said variable pitch diameter sheaves, and means operated by rotation of said housing for taking over adjustment of said sheaves as they approach the same effective pitch diameter adjustment and adjusting them to the same effective pitch diameter for arresting rotation of said housing, and manually operated means for operating said sheave adjusting means and to release said adjustment take-over means.

7. In a differential type variable speed device, a housing, planetary gears carried by said housing, sun gears meshing with said planetary gears and rotatable in opposite directions, variable pitch diameter sheaves connected to said sun planetary gears for rotating them and rotating said housing, power take-off means carried by and rotated with said housing, a driving sheave having its axis of rotation at approximately right angles to the axis of rotation of said variable pitch sheaves, an idler sheave having its axis approximately parallel with the axis of said driving sheave, a single power transmitting belt over said driving sheave, variable pitch sheaves, and said idler sheave, means for adjusting the effective pitch diameters of said sheaves including a shaft, manually rotated means for axially moving said shaft, means connecting said shaft to said sheaves whereby when said shaft is moved axially said sheaves will be adjusted to increase the effective pitch diameter of one sheave and decrease the effective pitch diameter of the other sheave, means operated by rotation of said housing to move said shaft and adjust said sheaves to the same effective pitch diameter to arrest rotation of said housing, said last-named means being constructed and arranged so that it will take over adjustment of the variable pitch diameter sheaves as their adjusting movement approaches the position where the effective pitch diameters of the sheaves are equal.

References Cited in the file of this patent

UNITED STATES PATENTS

| | | |
|---|---|---|
| 745,952 | Barnard | Dec. 1, 1903 |
| 2,218,712 | Johnson | Oct. 22, 1940 |
| 2,360,076 | Shaw | Oct. 10, 1944 |
| 2,408,264 | McClure | Sept. 24, 1946 |